US011619517B2

(12) United States Patent
Castang et al.

(10) Patent No.: US 11,619,517 B2
(45) Date of Patent: Apr. 4, 2023

(54) METHOD AND SYSTEM FOR DETERMINING AN ESTIMATION OF AN ANEMOMETRIC PARAMETER IN AN AIRCRAFT (71) Applicant: THALES CANADA INC., Toronto (CA)

(72) Inventors: Fabien Castang, Toronto (CA); Xavier Louis, Toronto (CA)

(73) Assignee: THALES CANADA INC., Toronto (CA)

(*) Notice: Subject to any disclaimer, the term of this patent is extended or adjusted under 35 U.S.C. 154(b) by 711 days.

(21) Appl. No.: 16/495,057

(22) PCT Filed: Aug. 31, 2018

(86) PCT No.: PCT/IB2018/056680
§ 371 (c)(1),
(2) Date: Sep. 17, 2019

(87) PCT Pub. No.: WO2019/043645
PCT Pub. Date: Mar. 7, 2019

(65) Prior Publication Data
US 2020/0011701 A1  Jan. 9, 2020

Related U.S. Application Data (60) Provisional application No. 62/553,381, filed on Sep. 1, 2017.

(51) Int. Cl.
*G05D 1/00* (2006.01)
*G01C 23/00* (2006.01)
(Continued)

(52) U.S. Cl.
CPC .............. *G01C 23/00* (2013.01); *B64D 43/02* (2013.01); *G01C 9/005* (2013.01); *G01P 5/02* (2013.01)

(58) Field of Classification Search
CPC ........ G01C 23/00; G01C 9/005; B64D 43/02; B64D 43/00; G01P 5/02; G01P 13/025; G01P 21/025; B64C 13/00; G05D 1/00
(Continued)

(56) References Cited

U.S. PATENT DOCUMENTS

2014/0371957 A1* 12/2014 Riedinger ............ G05D 1/0816
701/3
2016/0023776 A1* 1/2016 Ganguli .................... G01P 5/00
701/14
2018/0094932 A1* 4/2018 Skow ..................... B64D 45/04

FOREIGN PATENT DOCUMENTS

WO  2016191320 A1  12/2016

OTHER PUBLICATIONS

International Search Report from corresponding International Application No. PCT/IB2018/056680, dated Dec. 21, 2018, pp. 1-2, Canadian Intellectual Property Office, Quebec, Canada.
(Continued)

*Primary Examiner* — Shardul D Patel
(74) *Attorney, Agent, or Firm* — Hauptman Ham, LLP (57) ABSTRACT A method and system for determining an estimation of an anemometric parameter of an aircraft. The anemometric parameter including an angle of attack, a sideslip angle and a calibrated airspeed. The method including obtaining an indication of a secondary surface state of the aircraft; obtaining a position indication of a horizontal primary surface; obtaining a load applied estimation on a corresponding actuator using the position indication of the horizontal primary surface and the position of the corresponding actuator; accessing a lookup table with the indication of the secondary surface state of the aircraft, the load estimation applied on the corresponding actuator, and the position of the corresponding actuator; obtaining an estimation of the anemometric parameter associated with the horizontal pri-
(Continued)

mary surface; providing the estimation of the anemometric parameter associated with the horizontal primary surface and wherein the lookup table is generated during a learning phase.

20 Claims, 5 Drawing Sheets

(51) Int. Cl.
*B64D 43/02* (2006.01)
*G01C 9/00* (2006.01)
*G01P 5/02* (2006.01)

(58) Field of Classification Search
USPC .............................................................. 701/6
See application file for complete search history.

(56) References Cited

OTHER PUBLICATIONS

Extended European Search Report issued in European Patent Application No. 18852019.1, dated Mar. 16, 2020, pp. 1-8, European Patent Office, Munich, Germany.
Rhudy et al., "Aircraft Model-Independent Airspeed Estimation Without Pitot Tube Measurements", IEEE Transactions On Aerospace and Electronic Systems, vol. 51, No. 3, pp. 1980-1995, Jul. 2015.

* cited by examiner

METHOD AND SYSTEM FOR DETERMINING AN ESTIMATION OF AN ANEMOMETRIC PARAMETER IN AN AIRCRAFT

CROSS-REFERENCE TO RELATED APPLICATION

The present patent application claims priority on U.S. Provisional Application No. 62/553,381, filed on Sep. 1, 2018.

FIELD

The invention relates to management of aircraft systems. More precisely, the invention pertains to a method and a system for determining an estimation of an anemometric parameter in an aircraft.

BACKGROUND

Knowledge of calibrated airspeed (CAS) of an aircraft is key for a flight computer for various reasons.

For instance, it is used by the flight computer for providing a flight envelope protection. As a direct consequence, a loss of the pilot static system or the air data computer which are used for providing the calibrated airspeed can therefore have some serious consequences for the pilot of an aircraft.

As a matter of fact, default values are currently used for the flight envelope protection by the flight computer in the case where there is a default of the pilot static system.

Moreover, certain systems such as the autopilot may not be functional anymore in the case where there is a loss of the pilot static system or the air data computer.

Other anemometric parameters which may be impacted by a loss of the pilot static system or the air data computer comprise the angle of attack (AOA)/flight path angle (FPA) of the aircraft and the sideslip angle (beta) of the aircraft.

There is a need for a method and apparatus that will overcome at least one of the above-identified drawbacks.

Features of the invention will be apparent from review of the disclosure, drawings and description of the invention below.

BRIEF SUMMARY

According to a broad aspect of the invention, there is disclosed a method for determining an estimation of an anemometric parameter of an aircraft, the anemometric parameter selected from a group comprising at least one of an angle of attack, a sideslip angle and a calibrated airspeed, the method comprising obtaining an indication of a state of at least one secondary surface of the aircraft; obtaining an indication of a position of a horizontal primary surface; obtaining an estimation of the load applied on a corresponding actuator used for actuating the horizontal primary surface of the aircraft using at least the indication of the position of the horizontal primary surface and the position of the corresponding actuator; accessing at least one lookup table with the indication of the state of the at least one secondary surface of the aircraft, the estimation of the load applied on the corresponding actuator used for actuating the horizontal primary surface of the aircraft, and the position of the corresponding actuator; obtaining a corresponding estimation of the anemometric parameter of the aircraft associated with the horizontal primary surface; providing the corresponding estimation of the anemometric parameter of the aircraft associated with the horizontal primary surface and wherein the at least one lookup table is generated during a learning phase.

According to an embodiment, the obtaining of an estimation of the load applied on a corresponding actuator used for actuating the horizontal primary surface comprises determining a first load estimation according to a first method; determining a second load estimation according to a second method different than the first method; performing a consolidation of the first load estimation and the second load estimation to provide the estimation of the load applied on the corresponding actuator.

According to an embodiment, the performing of the consolidation comprises computing an average of the first load estimation and the second load estimation.

According to an embodiment, the method further comprises obtaining an indication of a position of a piston of the actuator of the horizontal primary surface, an indication of a first internal pressure of the piston of the actuator and an indication of a second internal pressure of the piston of the actuator; further wherein the first load estimation is determined using the indication of the position of the piston and the indication of the position of the horizontal primary surface actuated by the corresponding actuator and the second load estimation is determined using the indication of the position of the horizontal primary surface actuated by the corresponding actuator and the indication of the first internal pressure of the piston of the actuator and the indication of the second internal pressure of the piston of the actuator.

According to an embodiment, the method further comprises obtaining more than one other indication of a position for each of more than one other primary surface of the aircraft; obtaining more than one other estimation of a load applied on each of more than one other actuator used each for actuating one of the more than one other primary surface and a corresponding position of each corresponding actuator of the more than one other actuator; obtaining at least one of an inertial reference system (IRS) data of the aircraft and an estimation of an angle of attack (α) and an angle of slideslip (β) of the aircraft; accessing more than one other lookup table, each accessing with the indication of a state of the at least one secondary surface of the aircraft, a corresponding estimation of the load applied on a corresponding actuator of the more than one other actuator used for actuating a corresponding primary surface of the more than one other primary surface of the aircraft, and the corresponding position of the corresponding actuator used for actuating the corresponding primary surface of the more than one other corresponding surface; obtaining more than one corresponding estimation of the anemometric parameter of the aircraft, each corresponding estimation of the anemometric being associated with a corresponding primary surface of the more than one other primary surface; wherein the providing of the corresponding estimation of the anemometric parameter of the aircraft comprises using each of the obtained more than one corresponding estimation of the anemometric parameter of the aircraft, the corresponding estimation of the anemometric parameter associated with the horizontal primary surface of the aircraft and the at least one of the inertial reference system (IRS) data of the aircraft and the estimation of the angle of attack (α) and the angle of slideslip (β) of the aircraft to determine a corresponding estimation of the anemometric parameter of the aircraft.

According to an embodiment, the providing of the corresponding estimation of the anemometric parameter of the aircraft is performed upon detection of an event.

According to an embodiment, the event comprises an erroneous reading of the anemometric parameter.

According to an embodiment, the event comprises a detection of a failure of a given system of the aircraft.

According to an embodiment, the providing of the corresponding estimation of the anemometric parameter of the aircraft comprises displaying the corresponding estimation of the anemometric parameter.

According to an embodiment, the displaying of the corresponding estimation of the anemometric parameter of the aircraft is performed on a primary flight display.

According to an embodiment, the providing of the corresponding estimation of the anemometric parameter of the aircraft comprises recording the corresponding estimation of the anemometric parameter of the aircraft in a flight data recorder.

According to an embodiment, the providing of the corresponding estimation of the anemometric parameter of the aircraft comprises transmitting the corresponding estimation of the anemometric parameter of the aircraft to a remote location using a data network.

According to a broad aspect, there is disclosed a system for determining an estimation of an anemometric parameter of an aircraft, the anemometric parameter selected from a group comprising at least one of an angle of attack, a sideslip angle and a calibrated airspeed, the system comprising a state indication providing unit, obtaining an indication of a state of at least one secondary surface of the aircraft and providing the indication of a state of at least one secondary surface of the aircraft; a load estimation unit receiving an indication of a position of a corresponding horizontal primary surface and a position of a corresponding actuator used for actuating the horizontal primary surface, the load estimation unit for providing an estimation of the load applied on the corresponding actuator used for actuating the horizontal primary surface of the aircraft using at least the indication of the position of the horizontal primary surface and the position of the corresponding actuator; at least one lookup table associating a given estimation of a load applied on a corresponding actuator, a given indication of the state of the at least one secondary surface, a corresponding position of the corresponding actuator with a corresponding estimation of the anemometric parameter; a processing unit receiving the estimation of the load applied on the corresponding actuator, the indication of the state of at least one secondary surface of the aircraft and the position of the corresponding actuator and accessing the at least one lookup table with the indication of the state of the at least one secondary surface of the aircraft, the estimation of the load applied on the corresponding actuator used for actuating the horizontal primary surface of the aircraft and the position of the corresponding actuator and obtaining a corresponding estimation of the anemometric parameter of the aircraft associated with the horizontal primary surface; the processing unit further providing the corresponding estimation of the anemometric parameter of the aircraft associated with the horizontal primary surface and wherein the at least one lookup table is generated during a learning phase.

According to an embodiment, the load estimation unit comprises a first load estimation unit for determining a first load estimation according to a first method, a second load estimation unit for determining a second load estimation according to a second method different from the first method and a consolidation unit receiving the first load estimation, the second load estimation and performing a consolidation of the first load estimation and the second load estimation to provide the estimation of the load applied on the corresponding actuator.

According to an embodiment, the first load estimation unit receives the indication of the position of the corresponding horizontal primary surface and the position of the corresponding actuator, further wherein the first load estimation unit provides the estimation of the load applied on the corresponding actuator used for actuating the horizontal primary surface of the aircraft using at least the indication of the position of the horizontal primary surface and the position of the corresponding actuator; and further wherein the second load estimation unit receives the indication of the position of the horizontal primary surface actuated by the corresponding actuator and an indication of a first internal pressure of a piston of the corresponding actuator and an indication of a second internal pressure of the piston of the corresponding actuator and determines the estimation of the load applied on the corresponding actuator using the indication of the position of the horizontal primary surface actuated by the corresponding actuator and the indication of the first internal pressure of the piston of the actuator and the indication of the second internal pressure of the piston of the actuator.

According to an embodiment, the system further comprises at least one other load estimation unit, each of the at least one other load estimation unit receiving an indication of a corresponding position of a corresponding other primary surface and a corresponding position of a corresponding actuator used for actuating the corresponding other primary surface, each of the at least one other load estimation unit for providing a corresponding estimation of a load applied on the corresponding actuator used for actuating the corresponding other primary surface of the aircraft using at least the corresponding position of a corresponding primary surface and the corresponding position of the corresponding actuator; at least one other lookup table, each of the at least one other lookup table associating a given estimation of a load applied on a corresponding actuator, a given indication of a state of the at least one secondary surface, a corresponding position of a given corresponding actuator with a corresponding estimation of the anemometric parameter; at least one processing unit, each of the at least one processing unit receiving the corresponding estimation of the load applied on the corresponding at least one other actuator, the indication of the state of at least one secondary surface of the aircraft and the corresponding position of the corresponding at least one other actuator and accessing a corresponding one of the at least one other lookup table with the indication of the state of the at least one secondary surface of the aircraft, the corresponding estimation of the load applied on the corresponding at least one other actuator used for actuating the at least one other primary surface of the aircraft and the corresponding position of the corresponding actuator and obtaining a corresponding estimation of the anemometric parameter of the aircraft; the processing unit further providing the corresponding estimation of the anemometric parameter of the aircraft and an anemometric parameter estimation processing unit receiving the corresponding estimation of the anemometric parameter of the aircraft associated with the horizontal primary surface, each of the at least one other corresponding estimation estimate of the anemometric parameter of the aircraft and at least one of an inertial reference system (IRS) data of the aircraft and an estimation of an angle of attack ($\alpha$) and an angle of slideslip ($\beta$) of the aircraft and determining an estimation of the anemometric parameter of the aircraft using the corresponding estimation of the anemometric parameter of the aircraft associated with the horizontal primary surface, each of the at least one other corresponding estimation estimate of the anemometric parameter of the aircraft and the received at least one of the inertial reference system (IRS) data of the aircraft and the estimation of the angle of attack ($\alpha$) and the angle of slideslip ($\beta$) of the aircraft.

According to a broad aspect, there is disclosed a non-transitory computer readable storage medium for storing computer-executable instructions which, when executed, cause a processing device to perform a method for determining an estimation of an anemometric parameter of an aircraft, the anemometric parameter selected from a group comprising at least one of an angle of attack, a sideslip angle and a calibrated airspeed, the method comprising obtaining an indication of a state of at least one secondary surface of the aircraft; obtaining an indication of a position of a horizontal primary surface; obtaining an estimation of the load applied on a corresponding actuator used for actuating the horizontal primary surface of the aircraft using at least the indication of the position of the horizontal primary surface and the position of the corresponding actuator; accessing at least one lookup table with the indication of the state of the at least one secondary surface of the aircraft, the estimation of the load applied on the corresponding actuator used for actuating the horizontal primary surface of the aircraft, and the position of the corresponding actuator; obtaining a corresponding estimation of the anemometric parameter of the aircraft; providing the corresponding estimation of the anemometric parameter of the aircraft and wherein the at least one lookup table is generated during a learning phase.

According to an embodiment, in the learning phase, the processing unit further receives an indication of the anemometric parameter and generates at least one part of the at least one lookup table using the given estimation of the load applied on the corresponding actuator, the given indication of the state of the at least one secondary surface, the corresponding position of the corresponding actuator and the indication of the anemometric parameter.

According to an embodiment, the generation of the at least one part of the at least one lookup table is performed using an artificial intelligence-based technique selected from a group consisting of Bayesian networks, neuronal networks and deep learning technology.

According to an embodiment, the method further comprises receiving in the learning phase an indication of the anemometric parameter and generating during the learning phase at least one part of the at least one lookup table using the received indication of the anemometric parameter, the indication of the state of the at least one secondary surface of the aircraft, the estimation of the load applied on the corresponding actuator used for actuating the horizontal primary surface of the aircraft and the position of the corresponding actuator.

According to an embodiment, the generating during the learning phase of the at least one part of the at least one lookup table is performed using an artificial intelligence-based technique selected from a group consisting of Bayesian networks, neuronal networks and deep learning technology.

According to an embodiment, each of the at least one secondary surface is selected from a group consisting of a horizontal stabilizer trim of the aircraft, a spoiler of the aircraft, a slat of the aircraft and a flap of the aircraft.

According to an embodiment, each of the at least one secondary surface is selected from a group consisting of a horizontal stabilizer trim of the aircraft, a spoiler of the aircraft, a slat of the aircraft and a flap of the aircraft.

According to an embodiment, the horizontal primary surface is selected from a group consisting of an elevator of the aircraft, an aileron of the aircraft and a flaperon of the aircraft.

According to an embodiment, the horizontal primary surface is selected from a group consisting of an elevator of the aircraft, an aileron of the aircraft and a flaperon of the aircraft.

According to an embodiment, the state of the at least one secondary surface comprises a corresponding configuration of the at least one secondary surface.

According to an embodiment, the state of the at least one secondary surface comprises a corresponding configuration of the at least one secondary surface.

According to an embodiment, the state indication providing unit comprises at least one sensor, each sensor associated with a corresponding secondary surface of the at least one secondary surface of the aircraft.

An advantage of the method disclosed herein is that it provides an estimation of an anemometric parameter of an aircraft notwithstanding the state of the pilot static system, wherein the anemometric parameter is at least one of an angle of attack, a sideslip angle and a calibrated airspeed.

Another advantage of the method disclosed herein is that it is generic since it uses at least one lookup table which is generated during a learning phase.

Another advantage of the method disclosed herein is that it provides an estimation of an anemometric parameter which may supplement and/or replace a corresponding one generated using the pilot static system.

Another advantage of the method disclosed is that its use enables the providing of a flight envelope by the flight computer and other functions of the aircraft such as the autopilot.

BRIEF DESCRIPTION OF THE DRAWINGS

In order that the invention may be readily understood, embodiments of the invention are illustrated by way of example in the accompanying drawings.

Further details of the invention and its advantages will be apparent from the detailed description included below.

DETAILED DESCRIPTION

A detailed description of one or more embodiments of the invention is provided below along with accompanying figures that illustrate the principles of the invention. The invention is described in connection with such embodiments, but the invention is not limited to any embodiment. The scope of the invention is limited only by the claims, and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details.

Terms

The term "invention" and the like mean "the one or more inventions disclosed in this application," unless expressly specified otherwise.

The terms "an aspect," "an embodiment," "embodiment," "embodiments," "the embodiment," "the embodiments," "one or more embodiments," "some embodiments," "certain embodiments," "one embodiment," "another embodiment" and the like mean "one or more (but not all) embodiments of the disclosed invention(s)," unless expressly specified otherwise.

The term "variation" of an invention means an embodiment of the invention, unless expressly specified otherwise.

A reference to "another embodiment" or "another aspect" in describing an embodiment does not imply that the referenced embodiment is mutually exclusive with another embodiment (e.g., an embodiment described before the referenced embodiment), unless expressly specified otherwise.

The terms "including," "comprising" and variations thereof mean "including but not limited to," unless expressly specified otherwise.

The terms "a," "an" and "the" mean "one or more," unless expressly specified otherwise.

The term "plurality" means "two or more," unless expressly specified otherwise.

The term "herein" means "in the present application, including anything which may be incorporated by reference," unless expressly specified otherwise.

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example," and thus does not limit the term or phrase it explains. For example, in a sentence "the computer sends data (e.g., instructions, a data structure) over the Internet," the term "e.g." explains that "instructions" are an example of "data" that the computer may send over the Internet, and also explains that "a data structure" is an example of "data" that the computer may send over the Internet. However, both "instructions" and "a data structure" are merely examples of "data," and other things besides "instructions" and "a data structure" can be "data."

The term "respective" and like terms mean "taken individually." Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is," and thus limits the term or phrase it explains. For example, in the sentence "the computer sends data (i.e., instructions) over the Internet," the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g. 1.1, 1.2, . . . 1.9).

Where two or more terms or phrases are synonymous (e.g., because of an explicit statement that the terms or phrases are synonymous), instances of one such term/phrase do not mean instances of another such term/phrase must have a different meaning. For example, where a statement renders the meaning of "including" to be synonymous with "including but not limited to," the mere usage of the phrase "including but not limited to" does not mean that the term "including" means something other than "including but not limited to."

Various embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural and logical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

As disclosed below, the invention may be implemented in numerous ways.

With all this in mind, the present invention is directed to a system and a method for determining an estimation of an anemometric parameter in an aircraft.

Figure 1:
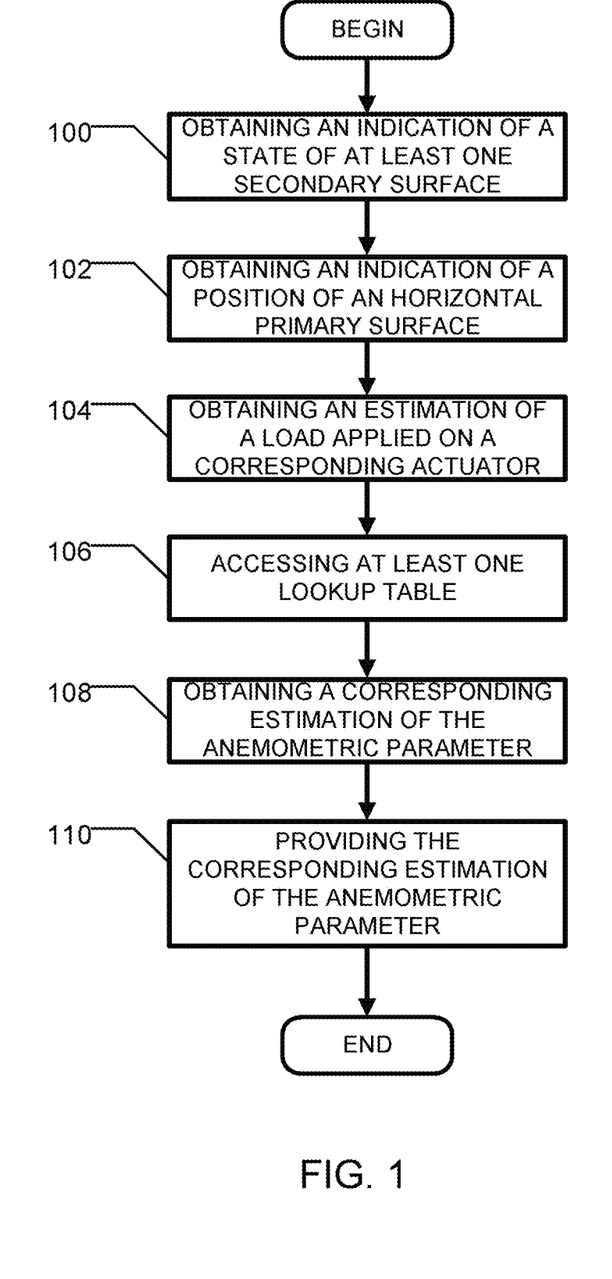
FIG. 1 is a flowchart that shows an embodiment of a method for determining an estimation of an anemometric parameter in an aircraft wherein the anemometric parameter is selected from a group comprising at least one of an angle of attack of the aircraft, a sideslip angle of the aircraft and a calibrated airspeed of the aircraft.

Now referring to FIG. 1, there is shown an embodiment of a method for determining an estimation of an anemometric parameter in an aircraft.

It will be appreciated that the anemometric parameter is selected from a group comprising at least one of an angle of attack of the aircraft, a sideslip angle of the aircraft and a calibrated airspeed of the aircraft.

It will be appreciated that the estimation of the anemometric parameter may be provided according to various embodiments.

For instance and in accordance with a first embodiment, the estimation of the anemometric parameter may be provided following a detection of an event. The event may be for instance a failure of a given system. The event may alternatively be a detection of an erroneous reading of a present anemometric parameter which leads to believe that a failure of a system has occurred or is currently occurring.

In accordance with a second embodiment, the estimation of the anemometric parameter is continuously generated.

According to processing step 100, an indication of a state of at least one secondary surface of the aircraft is obtained.

It will be appreciated by the skilled addressee that a secondary surface can be defined as a surface that acts on the aerodynamic coefficient (i.e., drag, lift and load). For instance, the secondary surface may be selected from a group consisting of a horizontal stabilizer trim, spoilers, slat and flap.

It will be appreciated that the state of a secondary surface means a corresponding configuration of the secondary surface. For instance, in the case where the secondary surface comprises a flap, the state may be an extension degree of the flap.

Figure 2:
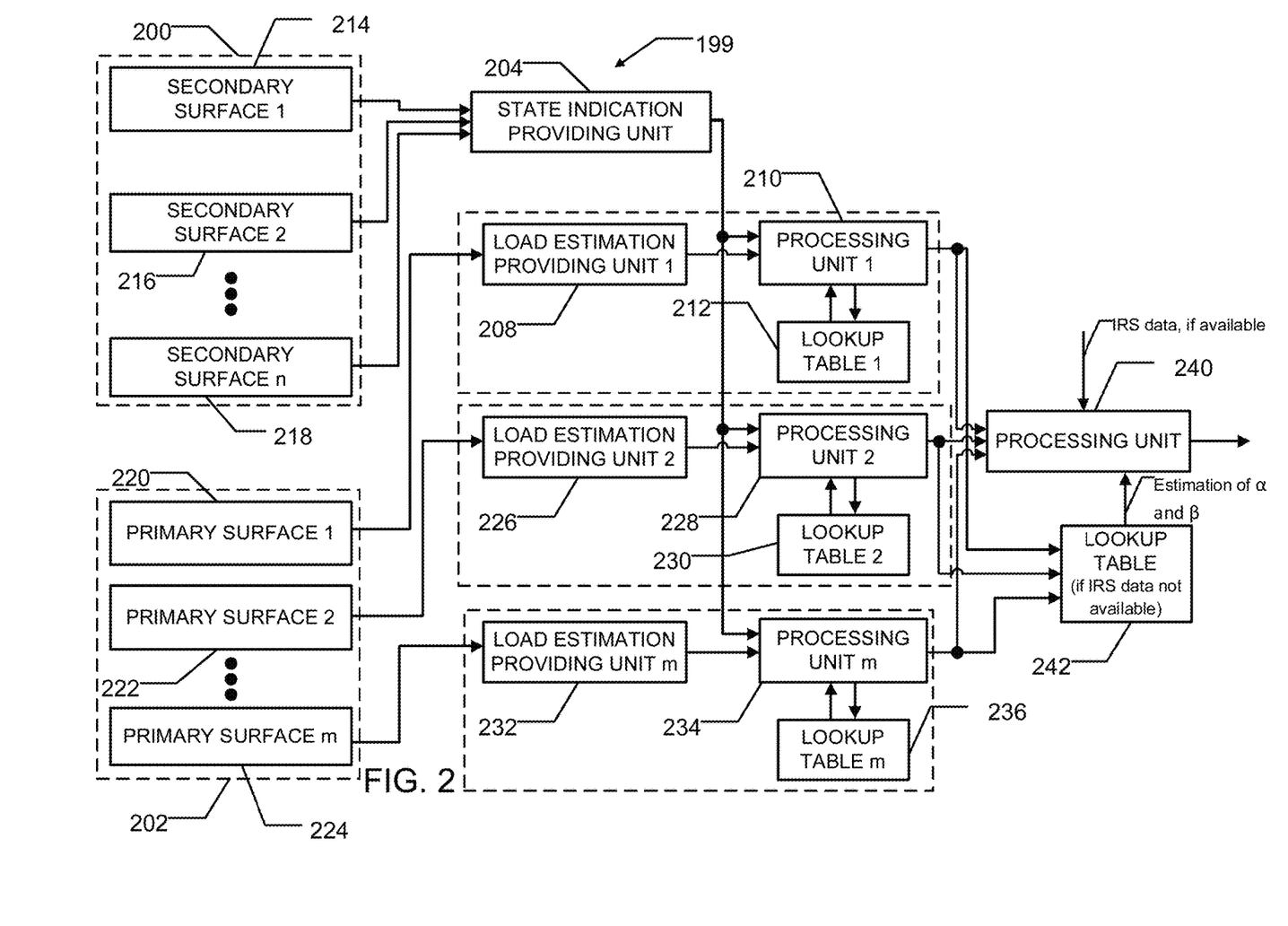
FIG. 2 is a diagram that shows an embodiment of a system for determining an estimation of an anemometric parameter in an aircraft wherein the anemometric parameter is selected from a group comprising at least one of an angle of attack of the aircraft, a sideslip angle of the aircraft and a calibrated airspeed of the aircraft. The system comprises, inter alia, a load estimation providing unit.

Now referring to FIG. 2, there is shown an embodiment of a system 199 for determining an estimation of an anemometric parameter in an aircraft.

The system 199 comprises a state indication providing unit 204, a load estimation providing unit 1 208, a processing unit 1 210, a lookup table 1 212, a load estimation providing unit 2 226, a processing unit 2 228, a lookup table 2 230, a load estimation providing unit m 232, a processing unit m 234, a lookup table m 236, a processing unit 240, a lookup table 242.

More precisely, the state indication providing unit 204 is used for providing an indication of a state of at least one secondary surface of the aircraft.

In the embodiment disclosed in FIG. 2, the state indication providing unit 204 is operatively coupled to at least one secondary surface 200. The at least one secondary surface 200 comprises a first secondary surface 214, a second secondary surface 216, . . . and an $n^{th}$ secondary surface 218.

In one embodiment, the state indication providing unit 204 comprises a plurality of sensors, each sensor associated with a given secondary surface of the at least one secondary surface 200.

The system 199 for determining an estimation of an anemometric parameter in an aircraft further comprises a load estimation providing unit 1 208. The load estimation providing unit 1 208 is used for providing an estimation of a load applied on a corresponding actuator used for actuating a primary surface of the aircraft. It will be appreciated by the skilled addressee that the load can be estimated but cannot be directly measured.

It will be appreciated that the load can be referred to as a weight applied to a surface and may further be estimated according to various embodiments, as further explained below.

It will be appreciated by the skilled addressee that a primary surface is defined as a surface that act on the aircraft attitude (i.e., on any one of a pitch angle, a roll angle and a yaw angle). For instance the primary surface may be selected from a group consisting of elevators, ailerons, flaperon and rudder of the aircraft.

In the embodiment disclosed in FIG. 2, the load estimation providing unit 1 208 is operatively coupled to a primary surface 1 220 of the at least one primary surface 202.

In fact, it will be appreciated that the at least one primary surface 202 comprises a first primary surface 220, a second primary surface 222, . . . and an $m^{th}$ primary surface 224. It will be further appreciated that at least one horizontal primary surface has to be used.

The system 199 further comprises a processing unit 1 210 and a lookup table 1 212. The processing unit 1 210 is operatively coupled to the load estimation unit 1 208, to the state indication providing unit 204 and to the lookup table 1 212.

The processing unit 1 210 receives an estimation of a load associated with the primary surface 1 220 from the load estimation providing unit 1 208 and an indication of a state of the at least one secondary surface 200 from the state indication providing unit 204 and accesses the lookup table 1 212 using that information to determine a first estimation of an anemometric parameter.

The system 199 for determining an estimation of an anemometric parameter in an aircraft further comprises a load estimation providing unit 2 226. The load estimation providing unit 2 226 is used for providing an estimation of a load applied on a corresponding actuator used for actuating a corresponding primary surface of the aircraft. As explained above, it will be appreciated by the skilled addressee that the load can be estimated but cannot be directly measured.

In the embodiment disclosed in FIG. 2, the load estimation providing unit 2 226 is operatively coupled to the primary surface 2 222 of the at least one primary surface 202.

The system 199 further comprises a processing unit 2 228 and a lookup table 2 230. The processing unit 2 228 is operatively coupled to the load estimation unit 2 226, to the state indication providing unit 204 and to the lookup table 2 230.

The processing unit 2 228 further receives an estimation of a load associated with the primary surface 2 222 from the load estimation providing unit 2 226 and an indication of a state of the at least one secondary surface 200 from the state indication providing unit 204 and accesses the lookup table 2 230 using that information to determine a second estimation of an anemometric parameter.

The system 199 for determining an estimation of an anemometric parameter in an aircraft further comprises a load estimation providing unit m 232. The load estimation providing unit m 232 is used for providing an estimation of a load applied on a corresponding actuator used for actuating a corresponding primary surface of the aircraft. As explained above, it will be appreciated by the skilled addressee that the load can be estimated but cannot be directly measured.

In the embodiment disclosed in FIG. 2, the load estimation providing unit m 232 is operatively coupled to primary surface m 224 of the at least one primary surface 202.

The system 199 further comprises a processing unit m 234 and a lookup table m 236. The processing unit m 234 is operatively coupled to the load estimation unit m 232, to the state indication providing unit 204 and to the lookup table m 236.

The processing unit m 234 receives an estimation of a load associated with the primary surface m 224 from the load estimation providing unit m 232 and an indication of a state of the at least one secondary surface 200 from the state indication providing unit 204 and accesses the lookup table m 236 using that information to determine an $m^{th}$ estimation of an anemometric parameter.

Still referring to FIG. 2, it will be appreciated that the system 199 for determining an estimation of an anemometric parameter in an aircraft further comprises a processing unit 240, also referred to as an anemometric parameter estimation processing unit.

The processing unit 240 is used for receiving the first estimation of an anemometric parameter from the processing unit 1 210, the second estimation of an anemometric parameter from the processing unit 2 228 and the $m^{th}$ estimation of an anemometric parameter from the processing unit m 234.

In the case where an inertial reference system (IRS) data signal is available, the processing unit 240 uses the inertial reference system (IRS) data signal available and the first estimation of an anemometric parameter from the processing unit 1 210, the second estimation of an anemometric parameter from the processing unit 2 228 and the $m^{th}$ estimation of an anemometric parameter from the processing unit m 234 to determine an estimation of the anemometric parameter.

In the case where no inertial reference system (IRS) data is available, the processing unit 240 uses data obtained from the lookup table 242 and the first estimation of an anemometric parameter from the processing unit 1 210, the second estimation of an anemometric parameter from the processing unit 2 228 and the $m^{th}$ estimation of an anemometric parameter from the processing unit m 234 to determine an estimation of the anemometric parameter. It will be appreciated that the data obtained from the lookup table 242 comprises an estimation of an angle of attack ($\alpha$) and an angle of slideslip ($\beta$) of the aircraft. It will be appreciated that the lookup table 242 is accessed using each of the first estimation of an anemometric parameter, the second estimation of an anemometric parameter and the $m^{th}$ estimation of an anemometric parameter.

It will be appreciated that the processing unit 240 may be of various types. In one embodiment, the processing unit 240 is implemented using for instance a logic of vote. For instance, an average of valid data may be computed. The validity of the data may be determined using the validity of a signal and a range of the position.

The processing unit 240 is further used for providing the corresponding estimation of the anemometric parameter of the aircraft.

It will be appreciated that the corresponding estimation of the anemometric parameter of the aircraft may be provided according to various embodiments.

In one embodiment, the corresponding estimation of the anemometric parameter of the aircraft is displayed to a pilot of the aircraft. It will be appreciated that the estimation of the anemometric parameter of the aircraft may be for instance displayed on a primary flight display (PFD) of the cockpit.

It will be further appreciated that the estimation of the anemometric parameter of the aircraft may also be recorded in a flight data recorder, as known to the skilled addressee.

It will be further appreciated that the estimation of the anemometric parameter of the aircraft may be further provided to a remote location using a data communication network. For instance, the estimation of the anemometric parameter of the aircraft may be provided to a remote location using various technologies such as for instance Mode S transponder technology, ADS-B technology, ACARS technology or the like.

The skilled addressee will appreciate that various alternative embodiments may be used for providing the estimation of the anemometric parameter of the aircraft.

It will be appreciated that various embodiments of the system 199 for determining an estimation of an anemometric parameter in an aircraft may be provided.

Now referring back to FIG. 1 and according to processing step 102, an indication of a position of a horizontal primary surface is obtained. The skilled addressee will appreciate that the position of a given primary surface refers to an angle value between the primary surface and a corresponding structure associated with the primary surface. The skilled addressee will further appreciate that the position of a given primary surface may be provided according to various alternative embodiments.

In the embodiment where the horizontal primary surface is the primary surface 1 220, the indication of a position of the horizontal primary surface is obtained using the load estimation providing unit 1 208 shown in FIG. 2.

Also, while in one embodiment an indication of a position of a horizontal primary surface is obtained for a single horizontal primary surface, it will be appreciated that in an alternative embodiment a plurality of indications of a position of a primary surface may be obtained from respectively a plurality of corresponding primary surfaces as explained further below. It will be appreciated that at least one of the plurality of corresponding primary surfaces has to be a horizontal primary surface as mentioned above.

According to processing step 104, an estimation of the load applied on the corresponding actuator used for actuating the horizontal primary surface of the aircraft is obtained.

For instance, in the case of the primary surface 1 220, it will be appreciated that the estimation of the load applied on the corresponding actuator is obtained using the load estimation providing unit 208 shown in FIG. 2.

Also, while in one embodiment an estimation of the load applied on the corresponding actuator used for actuating the horizontal primary surface of the aircraft is provided, it will be appreciated that in an alternative embodiment a plurality of load estimations may be obtained for respectively each actuator actuating a corresponding primary surface of a plurality of primary surfaces. In such embodiment, a plurality of estimations of a load applied respectively on each corresponding actuator used for actuating each corresponding primary surface may be used.

It will be appreciated that the estimation of the load applied on the corresponding actuator used for actuating the horizontal primary surface of the aircraft is obtained using at least the indication of a position of the primary surface and a position of the corresponding actuator.

According to processing step 106, at least one lookup table is accessed with the indication of a state of the at least one secondary surface of the aircraft, the indication of a position of the corresponding horizontal primary surface and the estimation of the load applied on the corresponding actuator used for actuating the corresponding horizontal primary surface of the aircraft.

While in one embodiment the anemometric parameter is one of an angle of attack of the aircraft, a sideslip angle of the aircraft and a calibrated airspeed of the aircraft, it will be appreciated by the skilled addressee that in an alternative embodiment the anemometric parameter comprises more than one of the angle of the attack of the aircraft, the sideslip angle of the aircraft and the calibrated airspeed of the aircraft.

In such embodiment an indication of the anemometric parameter may be further obtained.

It will be appreciated that the indication of an estimation of the anemometric parameter may be provided according to various embodiments.

In one embodiment, the indication of the anemometric parameter for which an estimation has to be provided may be provided by a system upon detection of a failure for providing the corresponding anemometric parameter. The failure may be determined in one embodiment when a loss of communication with the ADCs is detected. The failure may be determined in another embodiment if invalid signals are received. The failure may alternatively be detected if a probe becomes frozen.

It will be appreciated that the lookup table 1 212 may be accessed using the indication of the anemometric parameter for which an estimation has to be provided.

According to processing step 108, a corresponding estimation of the anemometric parameter of the aircraft is obtained.

It will be appreciated that the corresponding estimation of the anemometric parameter of the aircraft is obtained from the lookup table 212 in the embodiment shown in FIG. 2 and in the embodiment where the estimation of the anemometric parameter is determined based on the primary surface 1 220.

In an alternative embodiment, more than one estimation of the anemometric parameter may be used to determine a final estimation of the anemometric parameter.

In such embodiment, a first estimation of an anemometric parameter associated with the primary surface 1 220 is obtained. A second estimation of an anemometric parameter associated with the primary surface 2 222 is also obtained, . . . and an $m^{th}$ estimation of an anemometric parameter associated with the primary surface m 224 is also obtained.

Each of the first estimation of an anemometric parameter associated with the primary surface 1 220, the second estimation of an anemometric parameter associated with the primary surface 2 222 and the $m^{th}$ estimation of an anemometric parameter associated with the primary surface m 224 is provided respectively by the processing unit 1 210, the processing unit 2 228 and the processing unit m 234 shown in FIG. 2.

Still in this embodiment, the processing unit 240 receives each of the first estimation of an anemometric parameter associated with the primary surface 1 220, the second estimation of an anemometric parameter associated with the primary surface 2 222 and the $m^{th}$ estimation of an anemometric parameter associated with the primary surface m 224. The processing unit 240 further receives at least one of an inertial reference system (IRS) data of the aircraft and an estimation of an angle of attack ($\alpha$) and an angle of slideslip ($\beta$) of the aircraft and determines the estimation of the anemometric parameter associated with the aircraft using each of the first estimation of an anemometric parameter associated with the primary surface 1 220, the second estimation of an anemometric parameter associated with the primary surface 2 222, the $m^{th}$ estimation of an anemometric parameter associated with the primary surface m 224 and the received at least one of an inertial reference system (IRS) data of the aircraft and an estimation of an angle of attack ($\alpha$) and an angle of slideslip ($\beta$) of the aircraft. The skilled addressee will appreciate that this embodiment may provide a better estimate of the estimation of the anemometric parameter associated with the aircraft since it uses more than one primary surface.

According to processing step 110, the corresponding estimation of the anemometric parameter is provided.

It will be appreciated that the corresponding estimation of the anemometric parameter may be provided according to various embodiments as explained above.

In one embodiment, the corresponding estimation of the anemometric parameter of the aircraft is displayed to the pilot of the aircraft. It will be appreciated that the estimation of the anemometric parameter of the aircraft may be displayed for instance on a primary flight display (PFD) of the cockpit.

It will be appreciated that the estimation of the anemometric parameter of the aircraft may be also recorded in a flight data recorder as known to the skilled addressee.

It will be further appreciated that the estimation of the anemometric parameter of the aircraft may be further provided to a remote location using a data communication network.

It will be appreciated that the at least one lookup table is generated during a learning phase as further explained below.

Figure 3:
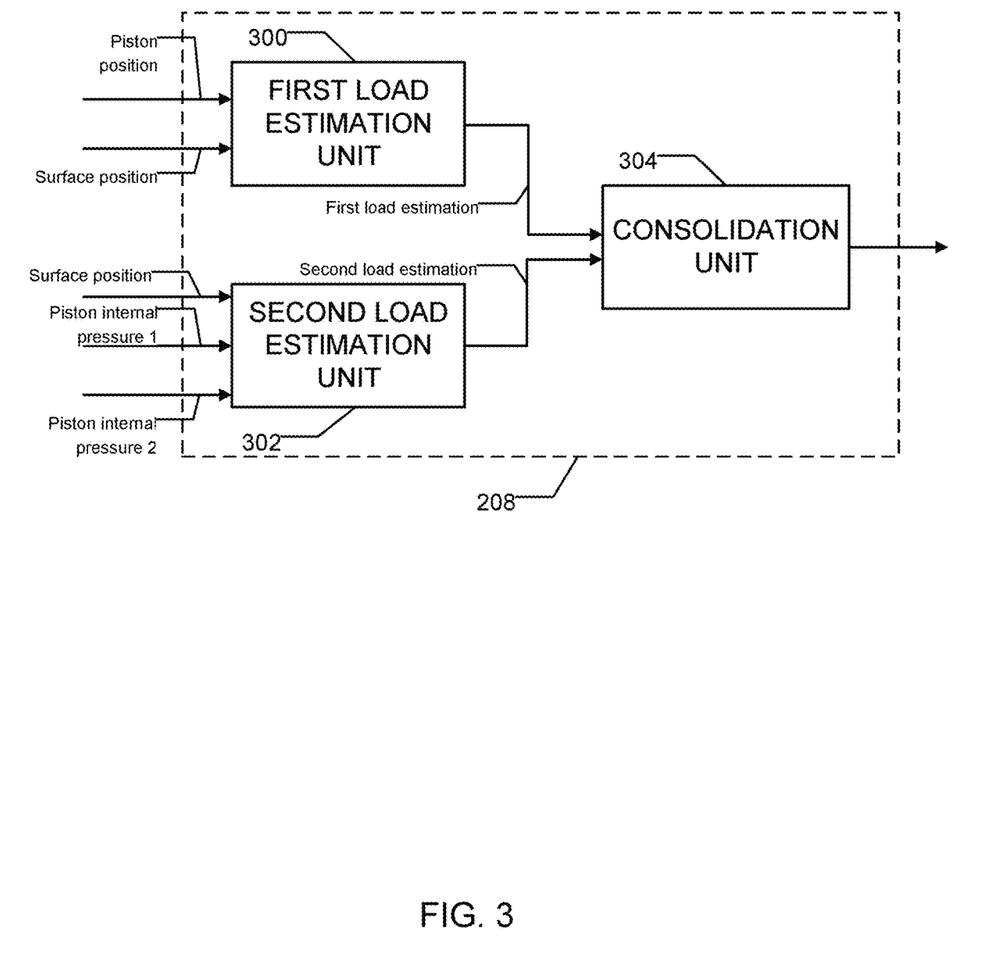
FIG. 3 is a diagram that shows an embodiment of a load estimation providing unit used in an embodiment of a method for determining an estimation of an anemometric parameter in an aircraft wherein the anemometric parameter is selected from a group comprising at least one of an angle of attack of the aircraft, a sideslip angle of the aircraft and a calibrated airspeed of the aircraft.

Now referring to FIG. 3, there is shown an embodiment of the load estimation providing unit 208.

In this embodiment, the load estimation providing unit 208 comprises a first load estimation unit 300, a second load estimation unit 302 and a consolidation unit 304.

It will be appreciated that the purpose of the load estimation providing unit 208 is to provide a more robust unit.

More precisely, it will be appreciated that the first load estimation unit 300 is used for providing a first load estimation signal. The first load estimation signal is generated using a position of a piston of a corresponding actuator and a surface position of the corresponding surface actuated by the corresponding actuator. It will be appreciated that the first load estimation unit 300 therefore computes a structural deformation of the surface actuated by the corresponding actuator. This is therefore one way to estimate a load.

The second load estimation unit 302 is used for providing a second load estimation signal. The second load estimation signal is generated using the surface position of the corresponding surface actuated by the corresponding actuator, a first internal pressure of the piston of the corresponding actuator and a second internal pressure of the piston of the corresponding actuator. It will be appreciated that the second load estimation unit 302 operates using the Newton's laws to generate an estimation of the load.

It will be appreciated by the skilled addressee that other alternative embodiments may be provided for estimating the load.

The consolidation unit 304 is used for receiving the first load estimation signal and the second load estimation signal and for generating a corresponding consolidated signal.

It will be appreciated by the skilled addressee that the purpose of the consolidating unit 304 is to do a mathematical operation, such as the computing of an average on the incoming signals or for instance use the second load estimation signal provided by the second load estimation unit 302 and use the first load estimation signal provided by the first load estimation unit 300 as a backup.

As mentioned above, it will be appreciated that the at least one lookup table 212 is generated during a learning phase.

Figure 4:
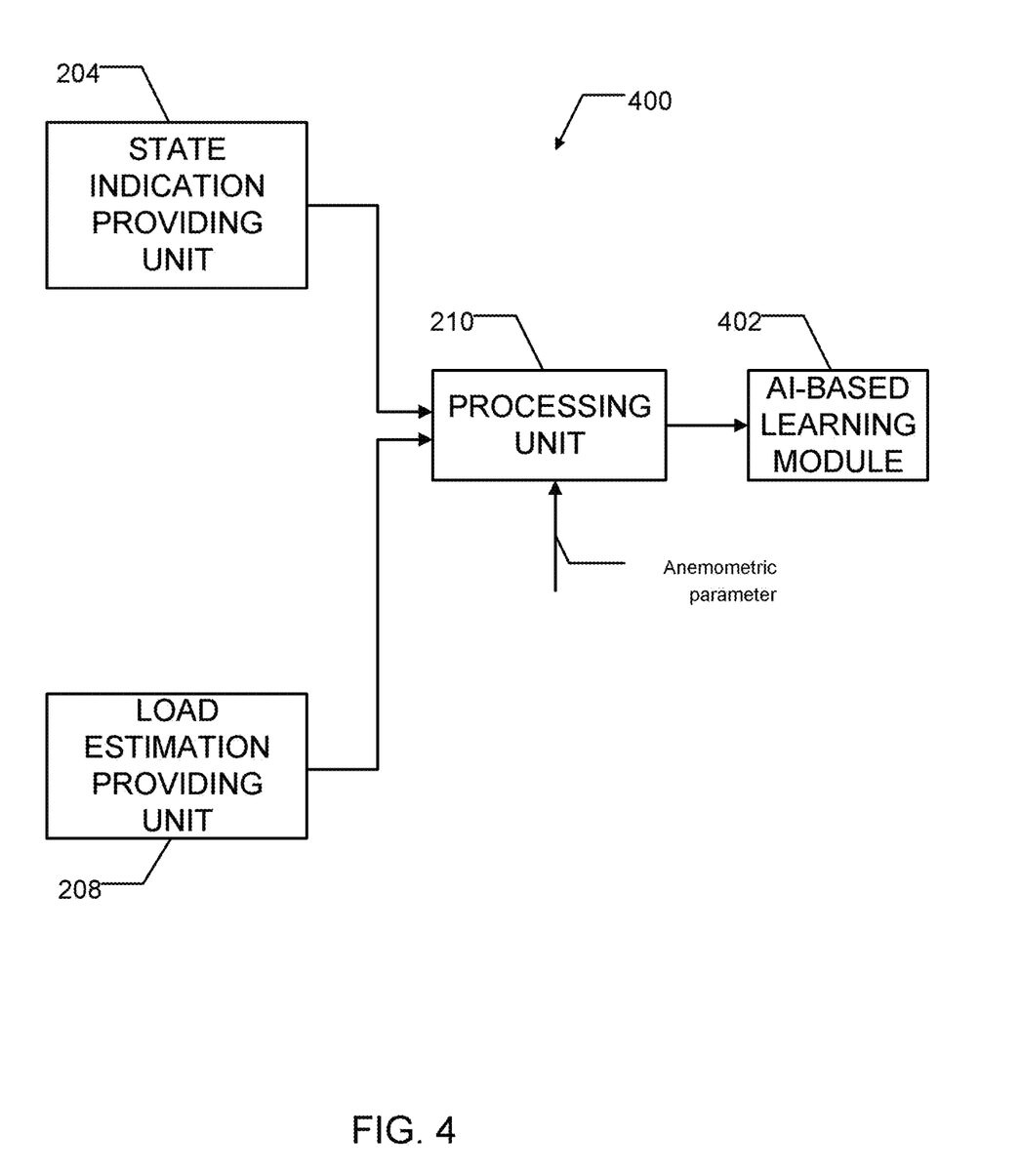
FIG. 4 is a diagram that shows an embodiment of an apparatus used for generating the at least one lookup table used by the method for determining an estimation of an anemometric parameter in an aircraft wherein the anemometric parameter is selected from a group comprising at least one of an angle of attack of the aircraft, a sideslip angle of the aircraft and a calibrated airspeed of the aircraft.

Now referring to FIG. 4, there is shown a first embodiment of a system 400 for achieving a learning phase for the purpose of building the at least one lookup table 212.

In this embodiment, the system comprises the state indication providing unit 204, the load estimation providing unit 208, the processing unit 210 and an artificial intelligence-based learning module 402.

It will be appreciated that in this embodiment the processing unit 210 further receives an indication of the accurate anemometric parameter. The purpose of the receiving of the accurate anemometric parameter is to train the artificial-intelligence-based learning module 402 using data received from the state indication providing unit 204 and the load estimation providing unit 208.

It will be appreciated that the training of the artificial-intelligence-based learning module 402 may be implemented according to various embodiments. In fact, it will be appreciated that the artificial-intelligence-based learning module 402 may be based on various technologies such as Bayesian networks, neuronal networks, deep learning technology, etc. Moreover it will be appreciated that once the artificial-intelligence-based learning module 402 is trained, the lookup table 212 may be generated accordingly.

In fact, it will be appreciated that the artificial-intelligence-based learning module 402 is progressively built using data, as known to the skilled addressee.

Figure 5:
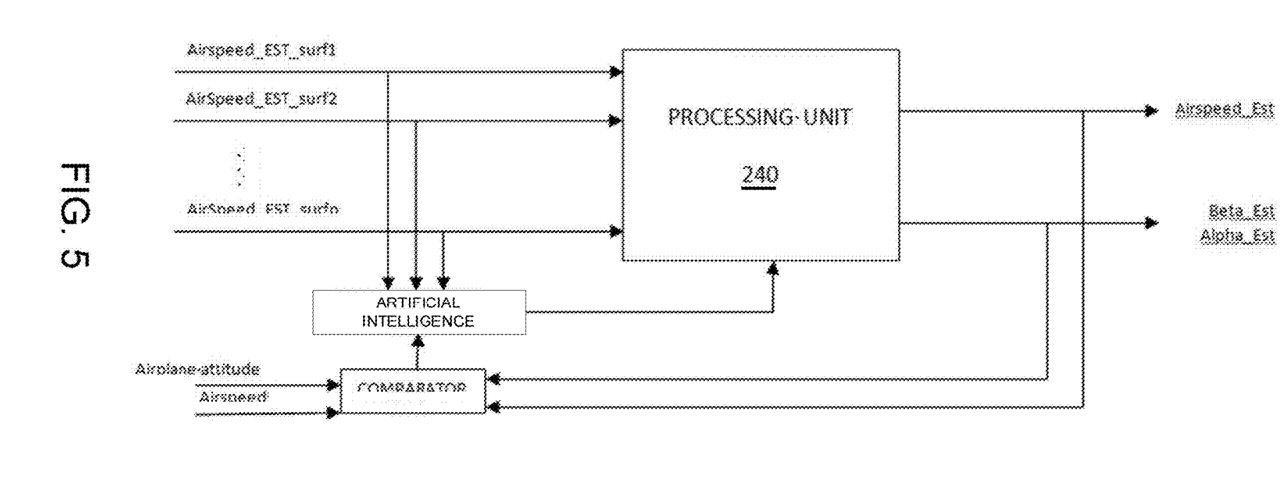
FIG. 5 is a diagram that shows another embodiment of an apparatus used for generating the at least one lookup table used by the method for determining an estimation of an anemometric parameter in an aircraft wherein the anemometric parameter is selected from a group comprising at least one of an angle of attack of the aircraft, a sideslip angle of the aircraft and a calibrated airspeed of the aircraft.

Now referring to FIG. 5, there is shown an embodiment for training the lookup table 242. As explained above, the lookup table 242 is used when a plurality of estimations of the anemometric parameter is used to determine the estimation of the anemometric parameter.

In the embodiment shown in FIG. 5, the anemometric parameter comprises a calibrated airspeed. As shown in FIG. 5, a first estimation of the anemometric parameter (referred to as Airspeed_EST_surf1) associated with the primary surface 1 220, a second estimation of the anemometric parameter (referred to as Airspeed_EST_surf2) associated with the primary surface 2 222, . . . and an m estimation of the anemometric parameter (referred to as Airspeed_EST_surfn) associated with the primary surface m 224 are received by the processing unit 240. The processing unit 240 generates an estimation of the airspeed (Airspeed_EST), an estimation of the angle of attack ($\alpha$) and the angle of slideslip ($\beta$) (respectively Alpha_EST and Beta_EST). A comparator is then used for comparing the estimation of the airspeed (Airspeed_EST), the estimation of the angle of attack ($\alpha$) and the estimation of the angle of slideslip ($\beta$) (respectively Alpha_EST and Beta_EST) with a current calibrated airspeed and a current airplane attitude and the result of the comparison is provided to the Artificial Intelligence learning module which also receives the first estimation of the anemometric parameter associated with the primary surface 1 220, the second estimation of the anemometric parameter associated with the primary surface 2 222, . . . and the $m^{th}$ estimation of the anemometric parameter associated with the primary surface m 224.

There is also disclosed a non-transitory computer readable storage medium for storing computer-executable instructions which, when executed, cause a processing device to perform a method for determining an estimation of an anemometric parameter of an aircraft, the anemometric parameter selected from a group comprising at least one of an angle of attack, a sideslip angle and a calibrated airspeed, the method comprising obtaining an indication of a state of at least one secondary surface of the aircraft; obtaining an indication of a position of a horizontal primary surface; obtaining an estimation of the load applied on a corresponding actuator used for actuating the horizontal primary surface of the aircraft using at least the indication of the position of the horizontal primary surface and the position of the corresponding actuator; accessing at least one lookup table with the indication of the state of the at least one secondary surface of the aircraft, the estimation of the load applied on the corresponding actuator used for actuating the horizontal primary surface of the aircraft, and the position of the corresponding actuator; obtaining a corresponding estimation of the anemometric parameter of the aircraft; providing the corresponding estimation of the anemometric parameter of the aircraft and wherein the at least one lookup table is generated during a learning phase.

It will be appreciated that the method for determining an estimation of an anemometric parameter of an aircraft disclosed herein is of great advantage for various reasons.

An advantage of the method disclosed herein is that it provides an estimation of an anemometric parameter of an aircraft notwithstanding the state of the pilot static system, wherein the anemometric parameter is at least one of an angle of attack, a sideslip angle and a calibrated airspeed.

Another advantage of the method disclosed herein is that it is generic since it uses at least one lookup table which is generated during a learning phase.

Another advantage of the method disclosed herein is that it provides an estimation of an anemometric parameter which may supplement and/or replace a corresponding one generated using the pilot static system.

Another advantage of the method disclosed is that its use enables the providing of a flight envelope by the flight computer and other functions of the aircraft such as the autopilot.

Although the above description relates to a specific preferred embodiment as presently contemplated by the inventor, it will be understood that the invention in its broad aspect includes functional equivalents of the elements described herein.

Clause 1. A method for determining an estimation of an anemometric parameter of an aircraft, the anemometric parameter selected from a group comprising at least one of an angle of attack, a sideslip angle and a calibrated airspeed, the method comprising:
obtaining an indication of a state of at least one secondary surface of the aircraft;
obtaining an indication of a position of a horizontal primary surface;
obtaining an estimation of the load applied on a corresponding actuator used for actuating the horizontal primary surface of the aircraft using at least the indication of the position of the horizontal primary surface and the position of the corresponding actuator;
accessing at least one lookup table with the indication of the state of the at least one secondary surface of the aircraft, the estimation of the load applied on the corresponding actuator used for actuating the horizontal primary surface of the aircraft, and the position of the corresponding actuator;
obtaining a corresponding estimation of the anemometric parameter of the aircraft associated with the horizontal primary surface;
providing the corresponding estimation of the anemometric parameter of the aircraft associated with the horizontal primary surface; and
wherein the at least one lookup table is generated during a learning phase.

Clause 2. The method as claimed in clause 1, where the obtaining of an estimation of the load applied on a corresponding actuator used for actuating the horizontal primary surface comprises:
determining a first load estimation according to a first method;
determining a second load estimation according to a second method different than the first method;
performing a consolidation of the first load estimation and the second load estimation to provide the estimation of the load applied on the corresponding actuator.

Clause 3. The method as claimed in clause 2, wherein the performing of the consolidation comprises computing an average of the first load estimation and the second load estimation.

Clause 4. The method as claimed in any one of clauses 2 to 3, further comprising obtaining an indication of a position of a piston of the actuator of the horizontal primary surface, an indication of a first internal pressure of the piston of the actuator and an indication of a second internal pressure of the piston of the actuator; further wherein the first load estimation is determined using the indication of the position of the piston and the indication of the position of the horizontal primary surface actuated by the corresponding actuator; and further wherein the second load estimation is determined using the indication of the position of the horizontal primary surface actuated by the corresponding actuator and the indication of the first internal pressure of the piston of the actuator and the indication of the second internal pressure of the piston of the actuator.

Clause 5. The method as claimed in clause 1, further comprising:

obtaining more than one other indication of a position for each of more than one other primary surface of the aircraft;

obtaining more than one other estimation of a load applied on each of more than one other actuator used each for actuating one of the more than one other primary surface and a corresponding position of each corresponding actuator of the more than one other actuator;

obtaining at least one of an inertial reference system (IRS) data of the aircraft and an estimation of an angle of attack ($\alpha$) and an angle of slideslip ($\beta$) of the aircraft;

accessing more than one other lookup table, each accessing with the indication of a state of the at least one secondary surface of the aircraft, a corresponding estimation of the load applied on a corresponding actuator of the more than one other actuator used for actuating a corresponding primary surface of the more than one other primary surface of the aircraft, and the corresponding position of the corresponding actuator used for actuating the corresponding primary surface of the more than one other corresponding surface;

obtaining more than one corresponding estimation of the anemometric parameter of the aircraft, each corresponding estimation of the anemometric being associated with a corresponding primary surface of the more than one other primary surface;

wherein the providing of the corresponding estimation of the anemometric parameter of the aircraft comprises using each of the obtained more than one corresponding estimation of the anemometric parameter of the aircraft, the corresponding estimation of the anemometric parameter associated with the horizontal primary surface of the aircraft and the at least one of the inertial reference system (IRS) data of the aircraft and the estimation of the angle of attack ($\alpha$) and the angle of slideslip ($\beta$) of the aircraft to determine a corresponding estimation of the anemometric parameter of the aircraft.

Clause 6. The method as claimed in any one of clauses 1 to 5, wherein the providing of the corresponding estimation of the anemometric parameter of the aircraft is performed upon detection of an event.

Clause 7. The method as claimed in clause 6, wherein the event comprises an erroneous reading of the anemometric parameter.

Clause 8. The method as claimed in clause 6, wherein the event comprises a detection of a failure of a given system of the aircraft.

Clause 9. The method as claimed in any one of clauses 1 to 8, wherein the providing of the corresponding estimation of the anemometric parameter of the aircraft comprises displaying the corresponding estimation of the anemometric parameter.

Clause 10. The method as claimed in clause 9, wherein the displaying of the corresponding estimation of the anemometric parameter of the aircraft is performed on a primary flight display.

Clause 11. The method as claimed in any one of clauses 1 to 10, wherein the providing of the corresponding estimation of the anemometric parameter of the aircraft comprises recording the corresponding estimation of the anemometric parameter of the aircraft in a flight data recorder.

Clause 12. The method as claimed in any one of clauses 1 to 11, wherein the providing of the corresponding estimation of the anemometric parameter of the aircraft comprises transmitting the corresponding estimation of the anemometric parameter of the aircraft to a remote location using a data network.

Clause 13. A system for determining an estimation of an anemometric parameter of an aircraft, the anemometric parameter selected from a group comprising at least one of an angle of attack, a sideslip angle and a calibrated airspeed, the system comprising:

a state indication providing unit, obtaining an indication of a state of at least one secondary surface of the aircraft and providing the indication of a state of at least one secondary surface of the aircraft;

a load estimation unit receiving an indication of a position of a corresponding horizontal primary surface and a position of a corresponding actuator used for actuating the horizontal primary surface, the load estimation unit for providing an estimation of the load applied on the corresponding actuator used for actuating the horizontal primary surface of the aircraft using at least the indication of the position of the horizontal primary surface and the position of the corresponding actuator;

at least one lookup table associating a given estimation of a load applied on a corresponding actuator, a given indication of the state of the at least one secondary surface, a corresponding position of the corresponding actuator with a corresponding estimation of the anemometric parameter;

an anemometric parameter estimation processing unit receiving the estimation of the load applied on the corresponding actuator, the indication of the state of at least one secondary surface of the aircraft and the position of the corresponding actuator and accessing the at least one lookup table with the indication of the state of the at least one secondary surface of the aircraft, the estimation of the load applied on the corresponding actuator used for actuating the horizontal primary surface of the aircraft and the position of the corresponding actuator and obtaining a corresponding estimation of the anemometric parameter of the aircraft associated with the horizontal primary surface; the processing unit further providing the corresponding estimation of the anemometric parameter of the aircraft associated with the horizontal primary surface;

wherein the at least one lookup table is generated during a learning phase.

Clause 14. The system as claimed in clause 13, wherein the load estimation unit comprises a first load estimation unit for determining a first load estimation according to a first method, a second load estimation unit for determining a second load estimation according to a second method different from the first method and a consolidation unit receiving the first load estimation, the second load estimation and performing a consolidation of the first load estimation and the second load estimation to provide the estimation of the load applied on the corresponding actuator.

Clause 15. The system as claimed in clause 14, wherein the first load estimation unit receives the indication of the position of the corresponding horizontal primary surface and the position of the corresponding actuator, further wherein the first load estimation unit provides the estimation of the load applied on the corresponding actuator used for actuating the horizontal primary surface of the aircraft using at least the indication of the position of the horizontal primary surface and the position of the corresponding actuator; and further wherein the second load estimation unit receives the indication of the position of the horizontal primary surface actuated by the corresponding actuator and an indication of a first internal pressure of a piston of the corresponding actuator and an indication of a second internal pressure of the piston of the corresponding actuator and determines the estimation of the load applied on the corresponding actuator using the indication of the position of the horizontal primary surface actuated by the corresponding actuator and the indication of the first internal pressure of the piston of the actuator and the indication of the second internal pressure of the piston of the actuator.

Clause 16. The system as claimed in any one of clauses 13 to 15, further comprising:

at least one other load estimation unit, each of the at least one other load estimation unit receiving an indication of a corresponding position of a corresponding other primary surface and a corresponding position of a corresponding actuator used for actuating the corresponding other primary surface, each of the at least one other load estimation unit for providing a corresponding estimation of a load applied on the corresponding actuator used for actuating the corresponding other primary surface of the aircraft using at least the corresponding position of a corresponding primary surface and the corresponding position of the corresponding actuator;

at least one other lookup table, each of the at least one other lookup table associating a given estimation of a load applied on a corresponding actuator, a given indication of a state of the at least one secondary surface, a corresponding position of a given corresponding actuator with a corresponding estimation of the anemometric parameter;

at least one processing unit, each of the at least one processing unit receiving the corresponding estimation of the load applied on the corresponding at least one other actuator, the indication of the state of at least one secondary surface of the aircraft and the corresponding position of the corresponding at least one other actuator and accessing a corresponding one of the at least one other lookup table with the indication of the state of the at least one secondary surface of the aircraft, the corresponding estimation of the load applied on the corresponding at least one other actuator used for actuating the at least one other primary surface of the aircraft and the corresponding position of the corresponding actuator and obtaining a corresponding estimation of the anemometric parameter of the aircraft; the processing unit further providing the corresponding estimation of the anemometric parameter of the aircraft; and a processing unit receiving the corresponding estimation of the anemometric parameter of the aircraft associated with the horizontal primary surface, each of the at least one other corresponding estimation estimate of the anemometric parameter of the aircraft and at least one of an inertial reference system (IRS) data of the aircraft and an estimation of an angle of attack ($\alpha$) and an angle of slideslip ($\beta$) of the aircraft and determining an estimation of the anemometric parameter of the aircraft using the corresponding estimation of the anemometric parameter of the aircraft associated with the horizontal primary surface, each of the at least one other corresponding estimation estimate of the anemometric parameter of the aircraft and the received at least one of the inertial reference system (IRS) data of the aircraft and the estimation of the angle of attack ($\alpha$) and the angle of slideslip ($\beta$) of the aircraft.

Clause 17. A non-transitory computer readable storage medium for storing computer-executable instructions which, when executed, cause a processing device to perform a method for determining an estimation of an anemometric parameter of an aircraft, the anemometric parameter selected from a group comprising at least one of an angle of attack, a sideslip angle and a calibrated airspeed, the method comprising:

obtaining an indication of a state of at least one secondary surface of the aircraft;

obtaining an indication of a position of a horizontal primary surface;

obtaining an estimation of the load applied on a corresponding actuator used for actuating the horizontal primary surface of the aircraft using at least the indication of the position of the horizontal primary surface and the position of the corresponding actuator;

accessing at least one lookup table with the indication of the state of the at least one secondary surface of the aircraft, the estimation of the load applied on the corresponding actuator used for actuating the horizontal primary surface of the aircraft, and the position of the corresponding actuator;

obtaining a corresponding estimation of the anemometric parameter of the aircraft;

providing the corresponding estimation of the anemometric parameter of the aircraft; and wherein the at least one lookup table is generated during a learning phase.

Clause 18. The system as claimed in clause 13, wherein in the learning phase, the processing unit further receives an indication of the anemometric parameter and generates at least one part of the at least one lookup table using the given estimation of the load applied on the corresponding actuator, the given indication of the state of the at least one secondary surface, the corresponding position of the corresponding actuator and the indication of the anemometric parameter.

Clause 19. The system as claimed in clause 18, wherein the generation of the at least one part of the at least one lookup table is performed using an artificial intelligence-based technique selected from a group consisting of Bayesian networks, neuronal networks and deep learning technology.

Clause 20. The method as claimed in clause 1, further comprising receiving in the learning phase an indication of the anemometric parameter and generating during the learning phase at least one part of the at least one lookup table using the received indication of the anemometric parameter, the indication of the state of the at least one secondary surface of the aircraft, the estimation of the load applied on the corresponding actuator used for actuating the horizontal primary surface of the aircraft and the position of the corresponding actuator.

Clause 21. The method as claimed in clause 20, wherein the generating during the learning phase of the at least one part of the at least one lookup table is performed using an artificial intelligence-based technique selected from a group consisting of Bayesian networks, neuronal networks and deep learning technology.

Clause 22. The method as claimed in any one of clauses 1 to 11, wherein each of the at least one secondary surface is selected from a group consisting of a horizontal stabilizer trim of the aircraft, a spoiler of the aircraft, a slat of the aircraft and a flap of the aircraft.

Clause 23. The system as claimed in any one of clauses 13, 14, 15, 16, 18 and 19, wherein each of the at least one secondary surface is selected from a group consisting of a horizontal stabilizer trim of the aircraft, a spoiler of the aircraft, a slat of the aircraft and a flap of the aircraft.

Clause 24. The method as claimed in any one of clauses 1, 2, 3, 4, 5, 6, 7, 8, 9, 10, 11 and 22, wherein the horizontal primary surface is selected from a group consisting of an elevator of the aircraft, an aileron of the aircraft and a flaperon of the aircraft.

Clause 25. The system as claimed in any one of clauses 13, 14, 15, 16, 18, 19 and 23, wherein the horizontal primary surface is selected from a group consisting of an elevator of the aircraft, an aileron of the aircraft and a flaperon of the aircraft.

Clause 26. The system as claimed in any one of clauses 13, 14, 15, 16, 18, 19, 23 and 25, wherein the state of the at least one secondary surface comprises a corresponding configuration of the at least one secondary surface.

Clause 27. The method as claimed in any one of clauses 1, 2, 3, 4, 5, 6, 7, 8, 9, 10, 11, 22 and 24, wherein the state of the at least one secondary surface comprises a corresponding configuration of the at least one secondary surface.

Clause 28. The system as claimed in any one of clauses 13, 14, 15, 16, 18, 19, 23, 25 and 26, wherein the state indication providing unit comprises at least one sensor, each sensor associated with a corresponding secondary surface of the at least one secondary surface of the aircraft.

The invention claimed is:

1. A method for determining an estimation of an anemometric parameter of an aircraft, the anemometric parameter selected from a group comprising at least one of an angle of attack, a sideslip angle and a calibrated airspeed, the method being executed by a processor, the processor being operatively connected to at least one state indication sensor, the method comprising:
   obtaining, from the at least one state indication sensor, an indication of a state of at least one secondary surface of the aircraft, the at least one secondary surface acting on an aerodynamic coefficient of the aircraft;
   obtaining an indication of a position of a horizontal primary surface, the horizontal primary surface acting on an attitude of the aircraft;
   obtaining an estimation of the load applied on a corresponding actuator used for actuating the horizontal primary surface of the aircraft using at least the indication of the position of the horizontal primary surface and the position of the corresponding actuator;
   computing a corresponding estimation of the anemometric parameter of the aircraft associated with the horizontal primary surface, the computing comprising accessing at least one lookup table with the indication of the state of the at least one secondary surface of the aircraft, the estimation of the load applied on the corresponding actuator used for actuating the horizontal primary surface of the aircraft, and the position of the corresponding actuator;
   providing the corresponding estimation of the anemometric parameter of the aircraft associated with the horizontal primary surface; and
   wherein the at least one lookup table is generated during a learning phase.

2. The method as claimed in claim 1, where the obtaining of an estimation of the load applied on a corresponding actuator used for actuating the horizontal primary surface comprises:
   determining a first load estimation according to a first method;
   determining a second load estimation according to a second method different than the first method;
   performing a consolidation of the first load estimation and the second load estimation to provide the estimation of the load applied on the corresponding actuator.

3. The method as claimed in claim 2, wherein the performing of the consolidation comprises computing an average of the first load estimation and the second load estimation.

4. The method as claimed in claim 2, further comprising obtaining an indication of a position of a piston of the actuator of the horizontal primary surface, an indication of a first internal pressure of the piston of the actuator and an indication of a second internal pressure of the piston of the actuator; further wherein the first load estimation is determined using the indication of the position of the piston and the indication of the position of the horizontal primary surface actuated by the corresponding actuator; and
   further wherein the second load estimation is determined using the indication of the position of the horizontal primary surface actuated by the corresponding actuator and the indication of the first internal pressure of the piston of the actuator and the indication of the second internal pressure of the piston of the actuator.

5. The method as claimed in claim 1, further comprising:
   obtaining more than one other indication of a position for each of more than one other primary surface of the aircraft;
   obtaining more than one other estimation of a load applied on each of more than one other actuator used each for actuating one of the more than one other primary surface and a corresponding position of each corresponding actuator of the more than one other actuator;
   obtaining at least one of an inertial reference system (IRS) data of the aircraft and an estimation of an angle of attack ($\alpha$) and an angle of slideslip ($\beta$) of the aircraft
   accessing more than one other lookup table, each accessing with the indication of a state of the at least one secondary surface of the aircraft, a corresponding estimation of the load applied on a corresponding actuator of the more than one other actuator used for actuating a corresponding primary surface of the more than one other primary surface of the aircraft, and the corresponding position of the corresponding actuator used for actuating the corresponding primary surface of the more than one other corresponding surface;
   obtaining more than one corresponding estimation of the anemometric parameter of the aircraft, each corresponding estimation of the anemometric being associated with a corresponding primary surface of the more than one other primary surface;
   wherein the computing of the corresponding estimation of the anemometric parameter of the aircraft comprises using each of the obtained more than one corresponding estimation of the anemometric parameter of the aircraft, the corresponding estimation of the anemometric parameter associated with the horizontal primary surface of the aircraft and the at least one of the inertial reference system (IRS) data of the aircraft and the estimation of the angle of attack ($\alpha$) and the angle of slideslip ($\beta$) of the aircraft to compute a corresponding estimation of the anemometric parameter of the aircraft.

6. The method as claimed in claim 1, wherein the providing of the corresponding estimation of the anemometric parameter of the aircraft is performed upon detection of an event.

7. The method as claimed in claim 6, wherein the event comprises an erroneous reading of the anemometric parameter.

8. The method as claimed in claim 6, wherein the event comprises a detection of a failure of a given system of the aircraft.

9. The method as claimed in claim 1, further comprising receiving in the learning phase an indication of the anemometric parameter and generating during the learning phase at least one part of the at least one lookup table using the received indication of the anemometric parameter, the indication of the state of the at least one secondary surface of the aircraft, the estimation of the load applied on the corresponding actuator used for actuating the horizontal primary surface of the aircraft and the position of the corresponding actuator.

10. The method as claimed in claim 9, wherein the generating during the learning phase of the at least one part of the at least one lookup table is performed using an artificial intelligence-based technique selected from a group consisting of Bayesian networks, neuronal networks and deep learning technology.

11. The method as claimed in claim 1, wherein the state of the at least one secondary surface comprises a corresponding configuration of the at least one secondary surface.

12. A system for determining an estimation of an anemometric parameter of an aircraft, the anemometric parameter selected from a group comprising at least one of an angle of attack, a sideslip angle and a calibrated airspeed, the system comprising:
   a state indication sensor, obtaining an indication of a state of at least one secondary surface of the aircraft and providing the indication of a state of at least one secondary surface of the aircraft;
   a load estimation controller receiving an indication of a position of a corresponding horizontal primary surface and a position of a corresponding actuator used for actuating the horizontal primary surface, the load estimation controller for providing an estimation of the load applied on the corresponding actuator used for actuating the horizontal primary surface of the aircraft using at least the indication of the position of the horizontal primary surface and the position of the corresponding actuator;
   a non-transitory storage medium comprising at least one lookup table for associating a given estimation of a load applied on a corresponding actuator, a given indication of the state of the at least one secondary surface, a corresponding position of the corresponding actuator with a corresponding estimation of the anemometric parameter;
   a processor receiving the estimation of the load applied on the corresponding actuator, the indication of the state of at least one secondary surface of the aircraft and the position of the corresponding actuator and accessing the at least one lookup table with the indication of the state of the at least one secondary surface of the aircraft, the estimation of the load applied on the corresponding actuator used for actuating the horizontal primary surface of the aircraft and the position of the corresponding actuator and obtaining a corresponding estimation of the anemometric parameter of the aircraft associated with the horizontal primary surface; the processor further providing the corresponding estimation of the anemometric parameter of the aircraft associated with the horizontal primary surface, the processor being operatively connected to each of the state indication sensor, the load estimation controller and the non-transitory storage medium;
   wherein the at least one lookup table is generated during a learning phase.

13. The system as claimed in claim 12, wherein the load estimation controller comprises a first load estimation controller for determining a first load estimation according to a first method, a second load estimation controller for determining a second load estimation according to a second method different from the first method and a consolidation unit receiving the first load estimation, the second load estimation and performing a consolidation of the first load estimation and the second load estimation to provide the estimation of the load applied on the corresponding actuator.

14. The system as claimed in claim 13, wherein the first load estimation controller receives the indication of the position of the corresponding horizontal primary surface and the position of the corresponding actuator, further wherein the first load estimation controller provides the estimation of the load applied on the corresponding actuator used for actuating the horizontal primary surface of the aircraft using at least the indication of the position of the horizontal primary surface and the position of the corresponding actuator; and
   further wherein the second load estimation controller receives the indication of the position of the horizontal primary surface actuated by the corresponding actuator and an indication of a first internal pressure of a piston of the corresponding actuator and an indication of a second internal pressure of the piston of the corresponding actuator and determines the estimation of the load applied on the corresponding actuator using the indication of the position of the horizontal primary surface actuated by the corresponding actuator and the indication of the first internal pressure of the piston of the actuator and the indication of the second internal pressure of the piston of the actuator.

15. The system as claimed in claim 12, further comprising:
   at least one other load estimation controller, each of the at least one other load estimation controller receiving an indication of a corresponding position of a corresponding other primary surface and a corresponding position of a corresponding actuator used for actuating the corresponding other primary surface, each of the at least one other load estimation controller for providing a corresponding estimation of a load applied on the corresponding actuator used for actuating the corresponding other primary surface of the aircraft using at least the corresponding position of a corresponding primary surface and the corresponding position of the corresponding actuator;
   at least one other lookup table, each of the at least one other lookup table associating a given estimation of a load applied on a corresponding actuator, a given indication of a state of the at least one secondary surface, a corresponding position of a given corresponding actuator with a corresponding estimation of the anemometric parameter;
   at least one processor, each of the at least one processors receiving the corresponding estimation of the load applied on the corresponding at least one other actuator, the indication of the state of at least one secondary surface of the aircraft and the corresponding position of the corresponding at least one other actuator and accessing a corresponding one of the at least one other lookup table with the indication of the state of the at least one secondary surface of the aircraft, the corresponding estimation of the load applied on the corresponding at least one other actuator used for actuating the at least one other primary surface of the aircraft and the corresponding position of the corresponding actuator and obtaining a corresponding estimation of the anemometric parameter of the aircraft; the processor further providing the corresponding estimation of the anemometric parameter of the aircraft; and an anemometric parameter estimation processor receiving the corresponding estimation of the anemometric parameter of the aircraft associated with the horizontal primary surface, each of the at least one other corresponding estimation estimate of the anemometric parameter of the aircraft and at least one of an inertial reference system (IRS) data of the aircraft and an estimation of an angle of attack ($\alpha$) and an angle of slideslip ($\beta$) of the aircraft and determining an estimation of the anemometric parameter of the aircraft using the corresponding estimation of the anemometric parameter of the aircraft associated with the horizontal primary surface, each of the at least one other corresponding estimation estimate of the anemometric parameter of the aircraft and the received at least one of the inertial reference system (IRS) data of the aircraft and the estimation of the angle of attack ($\alpha$) and the angle of slideslip ($\beta$) of the aircraft.

16. The system as claimed in claim 12, wherein in the learning phase, the processor further receives an indication of the anemometric parameter and generates at least one part of the at least one lookup table using the given estimation of the load applied on the corresponding actuator, the given indication of the state of the at least one secondary surface, the corresponding position of the corresponding actuator and the indication of the anemometric parameter.

17. The system as claimed in claim 16, wherein the generation of the at least one part of the at least one lookup table is performed using an artificial intelligence-based technique selected from a group consisting of Bayesian networks, neuronal networks and deep learning technology.

18. The system as claimed in claim 12, wherein the state of the at least one secondary surface comprises a corresponding configuration of the at least one secondary surface.

19. The system as claimed in claim 12, wherein the state indication sensor comprises a plurality of sensors, each sensor associated with a corresponding secondary surface of the at least one secondary surface of the aircraft.

20. A non-transitory computer readable storage medium for storing computer-executable instructions which, when executed, cause a processor to perform a method for determining an estimation of an anemometric parameter of an aircraft, the anemometric parameter selected from a group comprising at least one of an angle of attack, a sideslip angle and a calibrated airspeed, the method comprising:

obtaining, from at least one state indication sensor operatively connected to the processor, an indication of a state of at least one secondary surface of the aircraft;

obtaining an indication of a position of a horizontal primary surface;

obtaining an estimation of the load applied on a corresponding actuator used for actuating the horizontal primary surface of the aircraft using at least the indication of the position of the horizontal primary surface and the position of the corresponding actuator;

primary surface of the aircraft, and the position of the corresponding actuator;

computing a corresponding estimation of the anemometric parameter of the aircraft said computing comprising accessing at least one lookup table with the indication of the state of the at least one secondary surface of the aircraft, the estimation of the load applied on the corresponding actuator used for actuating the horizontal primary surface;

providing the corresponding estimation of the anemometric parameter of the aircraft; and wherein the at least one lookup table is generated during a learning phase.

* * * * *